United States Patent [19]

Press

[11] Patent Number: 4,776,463

[45] Date of Patent: Oct. 11, 1988

[54] DISKETTE HOLDER STORAGE TRAY

[75] Inventor: Ralph H. Press, Forest Hills, N.Y.

[73] Assignee: Digital Masters, Inc., New York, N.Y.

[21] Appl. No.: 903,700

[22] Filed: Sep. 5, 1986

[51] Int. Cl.⁴ .............................................. B65D 85/57
[52] U.S. Cl. ..................................... 206/444; 206/309;
   206/312; 206/425; 211/40; 220/22; 312/10
[58] Field of Search ............... 206/307, 309, 312, 313,
   206/425, 444; 211/40; 220/22; 312/10, 12

[56] References Cited

U.S. PATENT DOCUMENTS

| | | | |
|---|---|---|---|
| 1,021,598 | 3/1912 | Harrington | 206/425 |
| 1,321,010 | 11/1919 | Chernack | 312/12 |
| 2,182,460 | 12/1939 | Werner | 312/12 |
| 2,706,576 | 4/1955 | Thon | 220/22 |
| 4,387,802 | 6/1983 | Shearing | 206/444 |
| 4,473,153 | 9/1984 | Colangelo | 206/313 |
| 4,508,366 | 4/1985 | Brindle | 206/309 |
| 4,516,812 | 5/1985 | Gander et al. | 206/444 |
| 4,519,500 | 5/1985 | Perchak | 206/309 |
| 4,527,692 | 7/1985 | Neuman | 206/444 |
| 4,618,090 | 10/1986 | Cortellucci | 206/45.34 |
| 4,630,731 | 12/1986 | Albery | 206/425 |
| 4,676,372 | 6/1987 | Rager | 206/444 |
| 4,684,019 | 8/1987 | Egly | 206/444 |

FOREIGN PATENT DOCUMENTS

| | | | |
|---|---|---|---|
| 1312778 | 4/1973 | United Kingdom | 206/313 |
| 2028126 | 3/1980 | United Kingdom | 211/40 |

OTHER PUBLICATIONS

"The Easel", Innovative Technologies, Advertisement, unknown month, 1982.

Primary Examiner—Jimmy G. Foster
Attorney, Agent, or Firm—Marvin Feldman

[57] ABSTRACT

A tray is constructed for storing a plurality of diskette holders, each holder having different identifying indicia thereon, and the tray bottom being stepped so that each identifying indicia is viewable from the front of the tray. The diskette holders are in the form of a book with inside pouches to protect and store a plurality of diskettes. Both the diskette holder and tray combination is formed essentially entirely of transparent thermoplastic material.

5 Claims, 3 Drawing Sheets

DISKETTE HOLDER STORAGE TRAY

FIELD OF THE INVENTION

This invention relates to storage trays for diskette holders.

BACKGROUND AND DISCUSSION OF THE PRIOR ART

With the advent of the extensive use of computers, particularly personal computers, the protection, storage, and retrieval of diskettes has become a major problem.

Heretofore diskettes were stored in makeshift boxes or cartons, which rendered the diskettes subject to ready damage. In addition, the retrieval of the diskettes became a problem in that many diskettes had to be "thumbed through" in order to retrieve the particularly desired diskette.

Now there is provided by the present invention a diskette holder and storage tray which protects the diskette and yet provides for ready identification and retrieval of a particular diskette.

DISCUSSION OF THE PREFERRED EMBODIMENT

Figure 1:
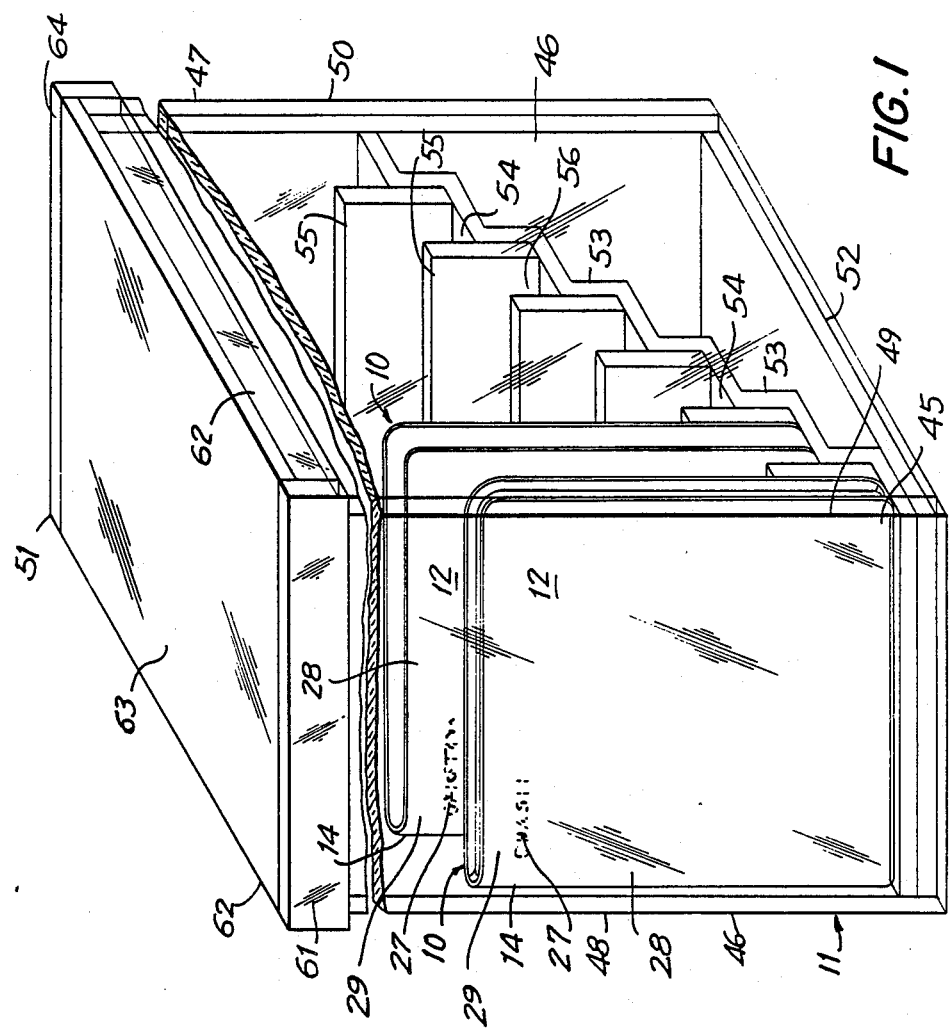
FIG. 1 is a front perspective view of the diskette holder tray of the present invention.
Figure 2:
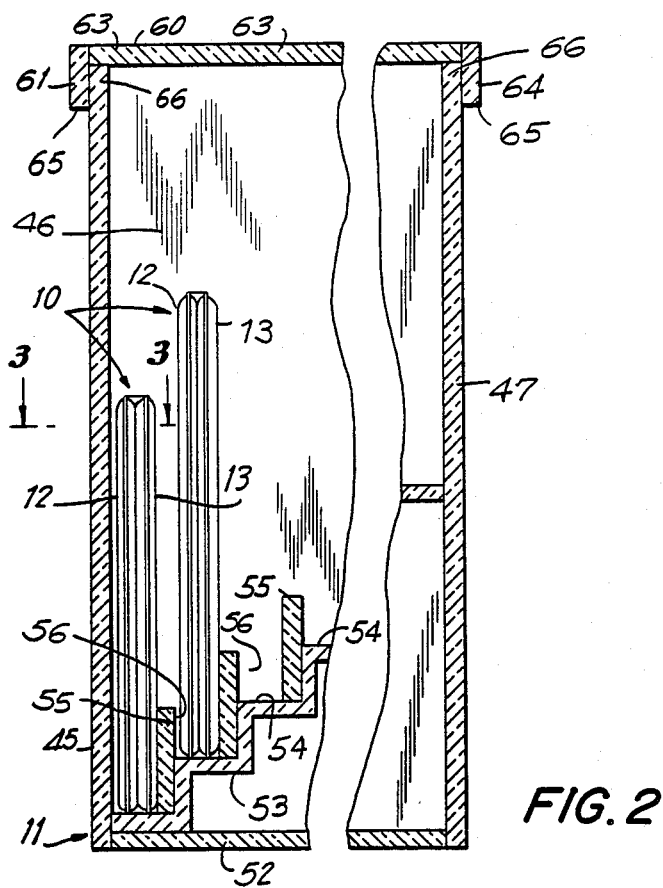
FIG. 2 is a right side view of the tray of FIG. 1.
Figure 3:
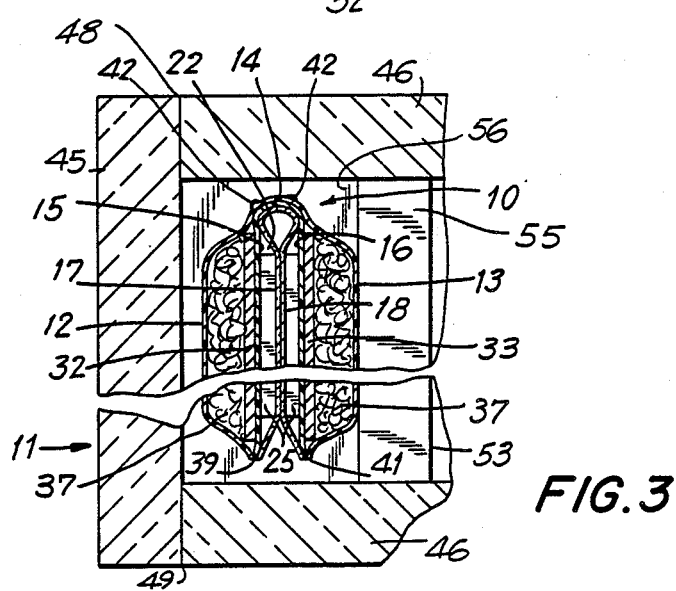
FIG. 3 is an enlarged partial sectional view taken along line 3—3 of FIG. 2.
Figure 4:
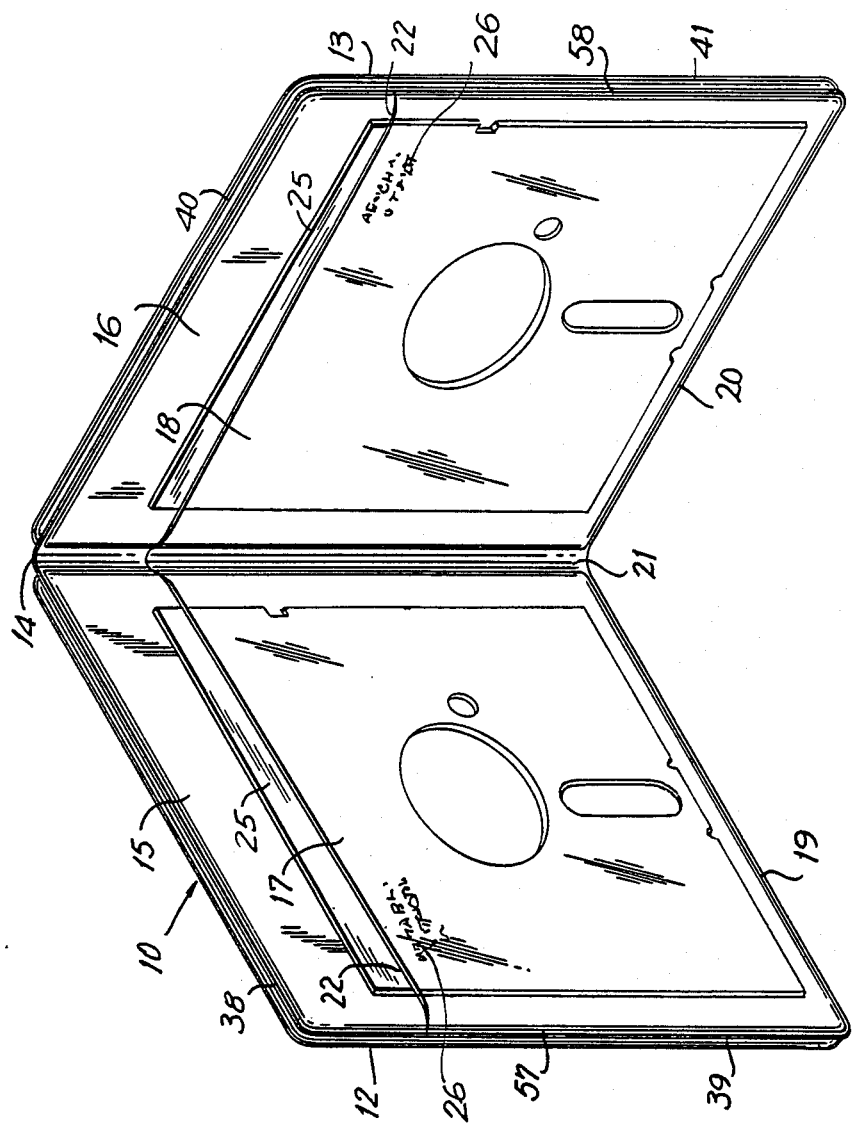
FIG. 4 is a perspective view of a holder.

Referring to the FIGURES, there is shown the diskette folder or holder 10 and tray 11 for storing holders 10.

Holder 10 has a front 12 and back 13, which are integrally joined at fold spine 14 to form a foldable construction. When unfolded, the inside panels 15 and 16 are exposed. Translucent or transparent plastic sheet members 17 and 18 are thermoplastically bonded to the respective panels 15 and 16, at bond edge surfaces 57, 58, 19, 20, and 21. The bonded sheet members 17 and 18 form slots or sleeves 22 and 22 for receiving computer diskettes 25. Members 17 and 18 permit the viewing of diskette identifying indicia, e.g. 26, on the diskette label. Additionally, diskette identifying indicia 27 is embossed or molded at the top left corner 29 of thermoplastic surface 28 of front 12 for purposes hereinafter appearing.

Front 12, back 13, spine 14, and panels 15 and 16 are formed of thermoplastic sheeting. Stiff reinforcing plastic or cardboard panels 32 and 33 are disposed between front 12 and inside panel 15, and back 13 and inside panel 16, respectively. Fibrous filling or padding 37 is disposed between the panels 32 and 33. The thermoplastic sheeting forming front 12, back 13, spine 14, and panels 15 and 16 is heat-sealed or seamed at edges 38, 39, 40, and 41, as well as along ribs 42 and 42 forming spine 14.

Tray 11 is formed of transparent rigid thermoplastic plates, namely front plate 45, side plates 46, and rear plate 47, with side plates joined to the front and back plates at the corners 48, 49, 50, and 51 by adhesive or thermoplastic bonding means. The bottom 52 of tray 11 is formed of a series of steps 53 having horizontal surfaces 54. The horizontal surfaces 54 are separated by vertical partition walls 55, thereby forming recesses 56 into which holders 10 are inserted. Each surface 54 is sized to receive one folder or holder 10.

Cover 60 is formed of transparent thermoplastic rigid plates, namely front plate 61, side plates 62, top plate 63, and rear plate 64, co-joined at the edges by adhesive or thermoplastic bonding to provide peripheral edge 65 which is disposed outside of peripheral edge 66 of tray 11.

With the holders 10 inserted in recesses 56 of trays 11, and with or without cover 60 in place, the user can view the identifying indicia 27 of each folder from the front of the tray, whereby the user can determine whether or not a specific diskette is available in the library of diskettes in the tray, as well as analyzing the entire array of diskettes in the library.

The above-identified holder, tray, and cover combination is also particularly useful as a merchandising display in promoting sales of the diskettes. The combinatin of the present invention is then useful as a display device as well as for the safe storage and ready retrieval of the diskettes, particularly so when a library of diskettes is available from the software manufacturer.

Thus it can be seen by one skilled in the art that there has been provided a diskette storage system which is relatively inexpensive to manufacture. While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A diskette holder and tray combination comprising: a tray comprising a front wall, a bottom wall and side walls connected to said bottom wall, said bottom wall including a plurality of horizontal wall portions disposed in different horizontally disposed planes and a plurality of vertical walls extending upwardly from the horizontal wall portions and separating each of the bottom wall portions; a diskette holder comprising a foldable member having front and back outside surfaces with top and bottom edges and opposed inside surfaces with the member folded, further comprising one sleeve formed on each inside surface and a diskette in each sleeve so that the diskettes are facingly disposed with the member folded, and identifying indicia being disposed on the front outside surface adjacent to the top edge; whereby when said folded diskette holder is inserted into the tray on one bottom wall portion and being vertically disposed between adjacent vertical walls so as to be held upright by said adjacent vertical walls, and said tray being of thermoplastic material and said front wall comprising a transparent thermoplastic plate, whereby with a plurality of inserted folded diskette holders on respective bottom wall portions, each respective identifying indicia is viewable from the front of the tray without removing the holders from the tray.

2. The combination of claim 1, said tray being formed essentially of thermoplastic material, and said front wall comprising a transparent thermoplastic plate.

3. The combination of claim 1, further comprising a cover for said tray.

4. The combination of claim 3, said tray and cover being transparent.

5. The combination of claim 4, said holder consisting essentially of thermoplastic sheeting.

* * * * *